United States Patent [19]

Fenlon

[11] Patent Number: 5,037,268
[45] Date of Patent: Aug. 6, 1991

[54] DUAL AXIS WIND TURBINE

[76] Inventor: Robert M. Fenlon, 6612 Flintlock, Houston, Tex. 77040

[21] Appl. No.: 154,171

[22] Filed: May 31, 1988

[51] Int. Cl.$^5$ ............................................. F03D 3/02
[52] U.S. Cl. ..................................... 415/4.4; 415/907; 415/2.1; 416/99
[58] Field of Search ................ 416/99, 176; 415/2-4, 415/DIG. 1 A, 4.4, 907, 914

[56] References Cited

U.S. PATENT DOCUMENTS

| | | | |
|---|---|---|---|
| 1,190,622 | 7/1916 | Bashor | 416/99 X |
| 1,744,924 | 1/1930 | Sargent | 416/116 X |
| 1,745,356 | 2/1930 | Crofton | 416/176 A X |
| 3,067,824 | 12/1962 | Sullivan | 416/99 X |
| 4,045,144 | 8/1977 | Loth | 415/2 A X |
| 4,166,580 | 5/1979 | Pohl | 415/2 R |
| 4,428,711 | 1/1984 | Archer | 415/2 A |
| 4,500,259 | 2/1985 | Schumacher | 416/176 A X |
| 4,616,973 | 10/1986 | Souchik | 416/DIG. 1 A X |
| 4,764,683 | 8/1988 | Coombes | 415/2 A X |

FOREIGN PATENT DOCUMENTS

| | | | |
|---|---|---|---|
| 2734938 | 2/1979 | Fed. Rep. of Germany | 416/175 A |
| 2944695 | 5/1981 | Fed. Rep. of Germany | 416/170 A |
| 3004669 | 8/1981 | Fed. Rep. of Germany | 416/99 |
| 681501 | 5/1930 | France | 416/170 A |
| 748194 | 6/1933 | France | 416/99 |
| 1021619 | 2/1953 | France | 416/99 |
| 2468003 | 5/1981 | France | 415/4 R |
| 2562609 | 10/1985 | France | 415/2 R |
| 2573818 | 5/1986 | France | 415/2 R |
| 40257 | 3/1980 | Japan | 416/175 A |
| 60870 | 5/1981 | Japan | 416/175 A |
| WO02099 | 4/1987 | PCT Int'l Appl. | 415/2 R |
| 39680 | 3/1957 | Poland | 416/99 |

Primary Examiner—Everette A. Powell, Jr.

[57] ABSTRACT

The invention relates to our energy conversion system for converting the kinetic energy possessed by the wind into mechanical energy. The objective is to produce a controlled, tornado like, turbulence around a turbine. This is accomplished by using a deflector to channel the air over a main body made up of five rotating wings which in turn deflect the air into small turbine rotatably connected to the wings.

1 Claim, 19 Drawing Sheets

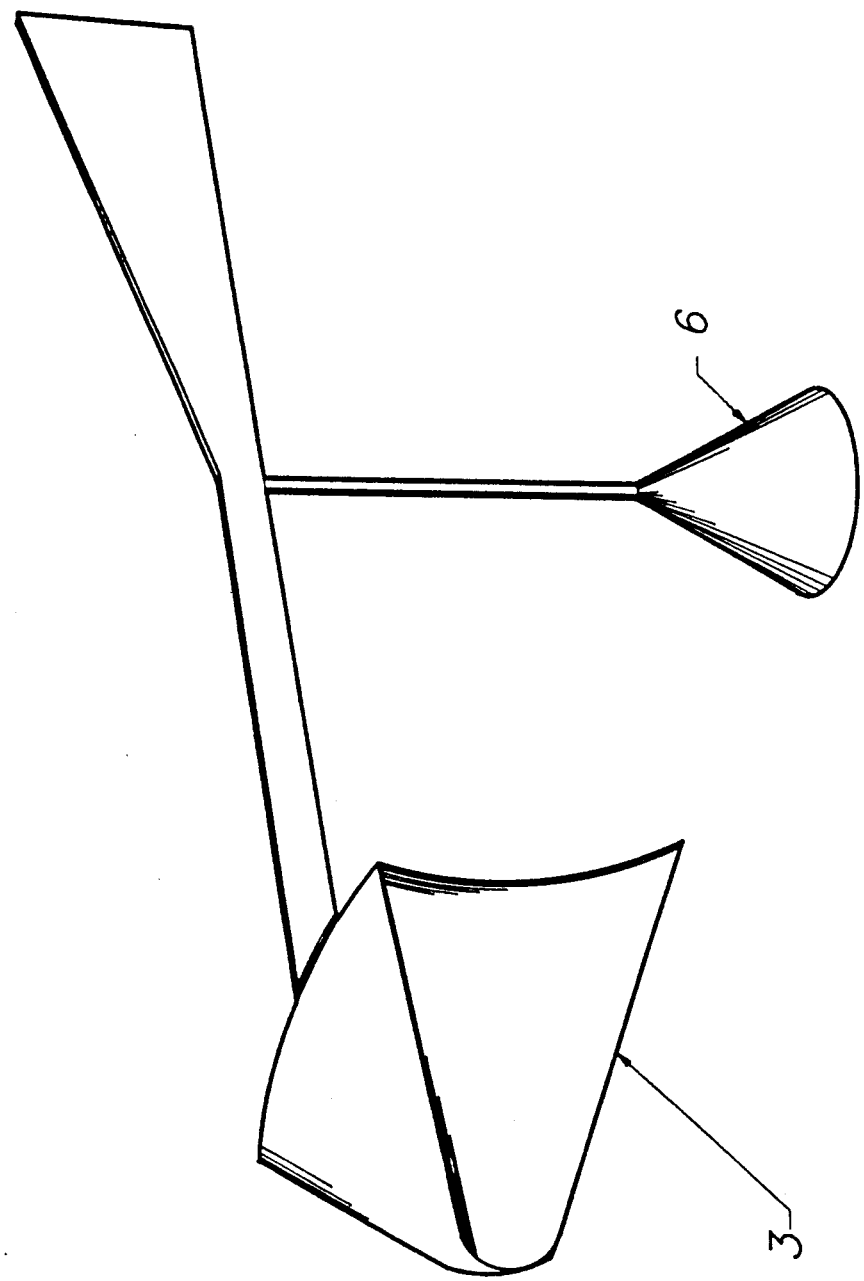

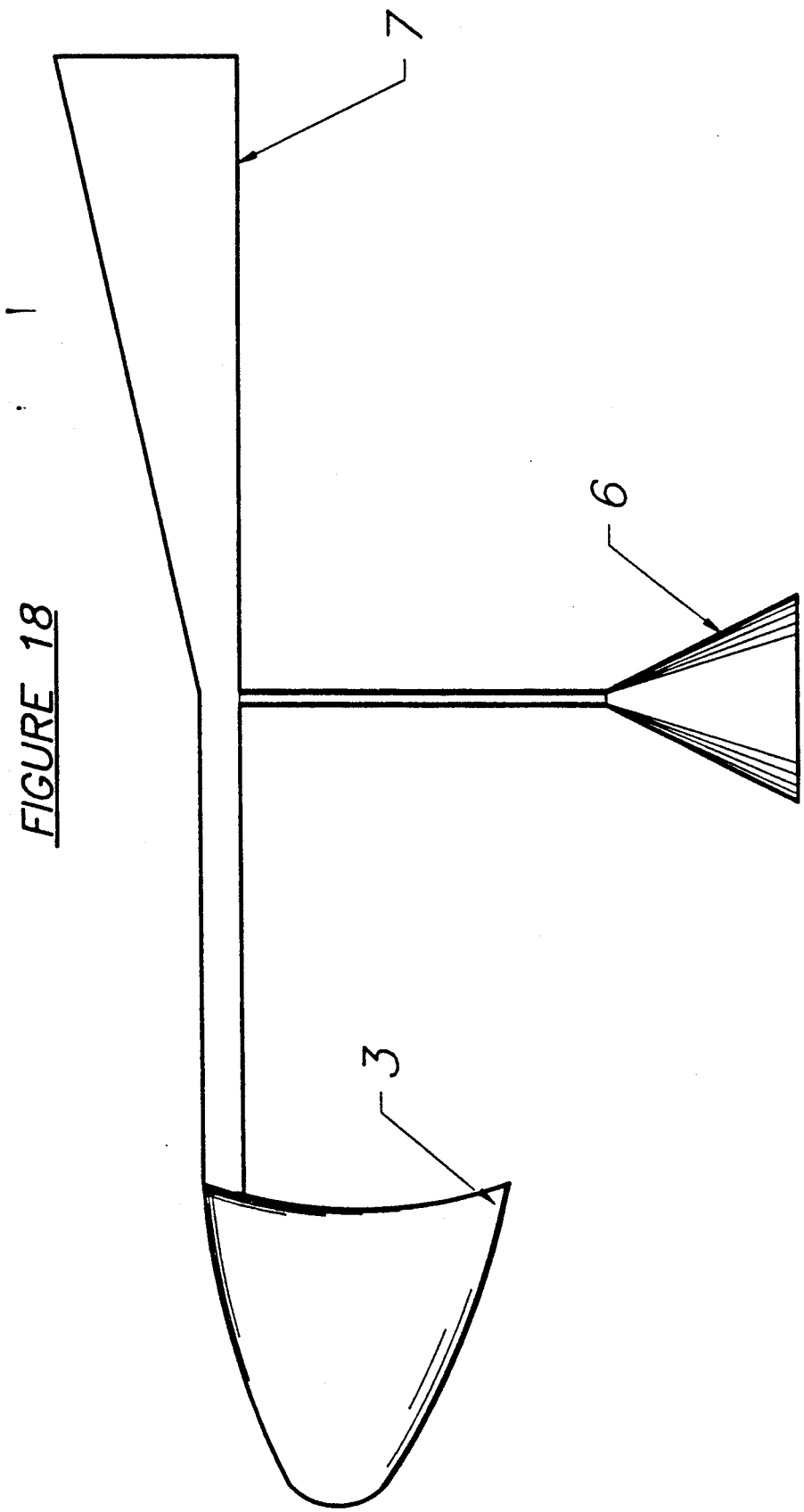

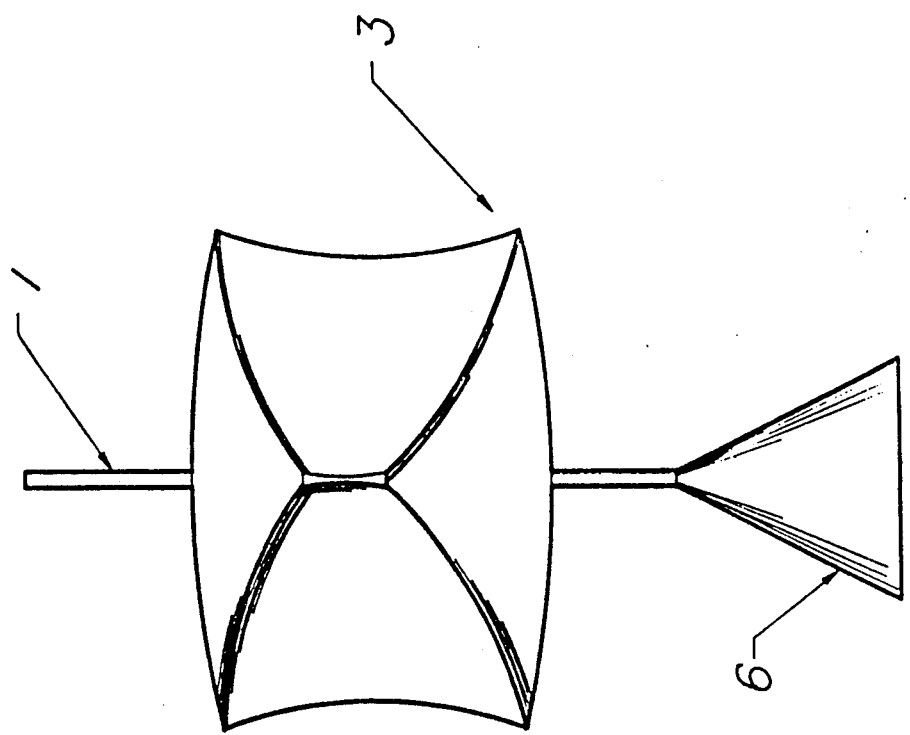

DUAL AXIS WIND TURBINE

BACKGROUND OF THE INVENTION

The present invention relates to an improved assembly for converting kinetic energy of the atmosphere such as blowing wind, into machine motion (rotation) which can then be utilized for the production of electricity or other proposes. The wind is uniquely deflected and channeled over a series of foils in such a way so as to increase its density and accelerate its flow. This controlled channel of air or controlled turbulence is directed onto a turbine blade specifically designed so as to rotate in the turbulence.

Description of Prior Art

The wind has long been used as a source or power by various means with varying degrees of success. Almost any form of foil has been used and numerous combinations of foils and motions have been used. However efficiency has been limited generally by the fact that the air is low in density and the wind speed is often low. A deflector has often been placed in front of the turbine which dose increase efficiency to some degree. As evidenced by the U.S. Pat. Nos. 4,754,683 Coombes, 4,156,580 Pohl, 4,265,086 Bahrenburg, 4,293,274 Gilman, and 4,369,629 Lockwood.

Pohl and now Coombes attempt to utilize a similar type of turbine behind a deflector. They are primitive devices of questionable efficiency Coombes rear nacelle dose nothing to improve the efficient of the device and in fact causes unnecessary turbulence.

While Herter 3004669 of Germany and Jagodzinski 39680 of Poland have provided the concept of placing secondary rotors on primary rotors. Their intent was simply to increase wind speed of the secondary rotors by putting them in motion.

SUMMARY OF THE INVENTION

The present invention utilizes the current of air created by the form and by the motion and of the primary rotor to propel the secondary rotor. A unique idea. Further this is part of the unique process that creates a controlled turbulence much like a miniature tornado. From this tornado the energy is extracted. The tornado is created where the turbine is located, not created by the turbine. Although the turbine dose enhance the tornados form and structure. This is accomplished by the sculpture of the device as a whole and the motion of its parts. Never before has anyone attempted to build a device that creates a tornado and extract the energy from said tornado. That is a new and unique idea.

Accordingly, it is the primary objective of the present invention to provide an electric generator driven by the motion of the passing wind or atmosphere. The components of which are a base, a deflector vertically and rotatably connected with the base, a main body rotatably connected with the base behind the deflector and on the same vertical axis, accelerator turbines rotatably connected with the main body on a horizontal axis and an assembly for coupling the rotors with the generator to produce electricity.

More Particularly, the DEFLECTOR which has a tail and like a weathervain and always heads into the wind its purpose is to start the formation of the air current and channel it down its sides and onto the proper area of the main body. It would also reduce drag on the main body. The MAIN BODY, a star shaped device having five identical wings, one on each point of the star. The Main Body is balanced and mounted on the base and much like a top it shall spin free with the slightest push or breeze. These wings have a concave and a convex side. When the current of air is deflected by the Deflector onto the concave side of the wings the main body rotates, thereby pushing the wedge or convex side of the wing into the current of air being deflected onto the main body off the opposite side of the Deflector. All of these components move freely in the wind.

Located on the top and bottom of each wing of the main body is a concave channel this channel is almost parallel to the front edge of the wing which is at an angel to the radius line of the circle in which the main body rotates. The angel is such that the outermost point on the channel is behind the radius line and the innermost point in front of the radius line. The size and angel of these foils and cavities combined with the motion of the components is balanced so as to cause the current of air that passes over the concave channel in the wing to drop and rotate within the channel. This rotation force is further increased by the fact that the outermost point of the channel is the point of the channel closest to the outside edge and closest to the rear edge of the wing. The vacuum created in the wake of the wing serves to suck the current of rOtating air past this particular point with the greatest intensity their by providing the necessary draw to accelerate the miniature tornado being created. Into this canal is located the ACCELERATOR TURBINE Basically a twisted "S" Type Blade Looking much like a common screw, however with a concave and convex side. The concave side gathers the force of the wind as the convex side defuses it. The result being rotation. The size and blade angeles of this turbine complement the tornado being formed within the channel thereby spinning within the tornado and reinforcing it as if providing its backbone.

It is a further object of the invention to provide flaps located in the wings in front of the turbines which can be raised so as to stop overspeed.

BRIEF DESCRIPTION OF THE FIGURES

FIG. 17 is a isometric view of the deflector with tail fin and base.

FIG. 18 is a flat side view of the deflector.

FIG. 19 is a flat front view of the deflector.

DETAILED DESCRIPTION

Figure 1:
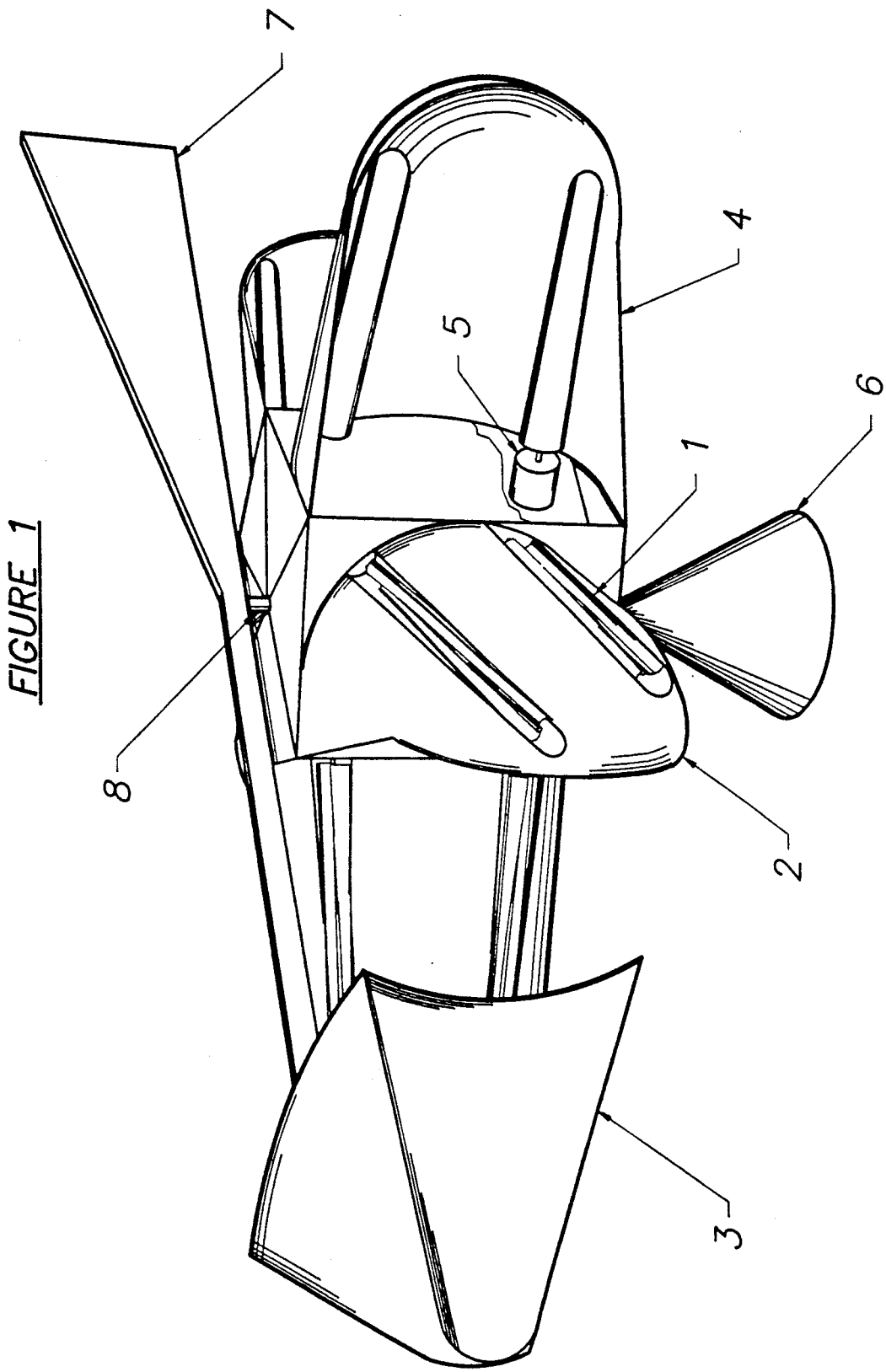
FIG. 1 is an isometric view of the entire wind turbine according to the invention.
Figure 2:
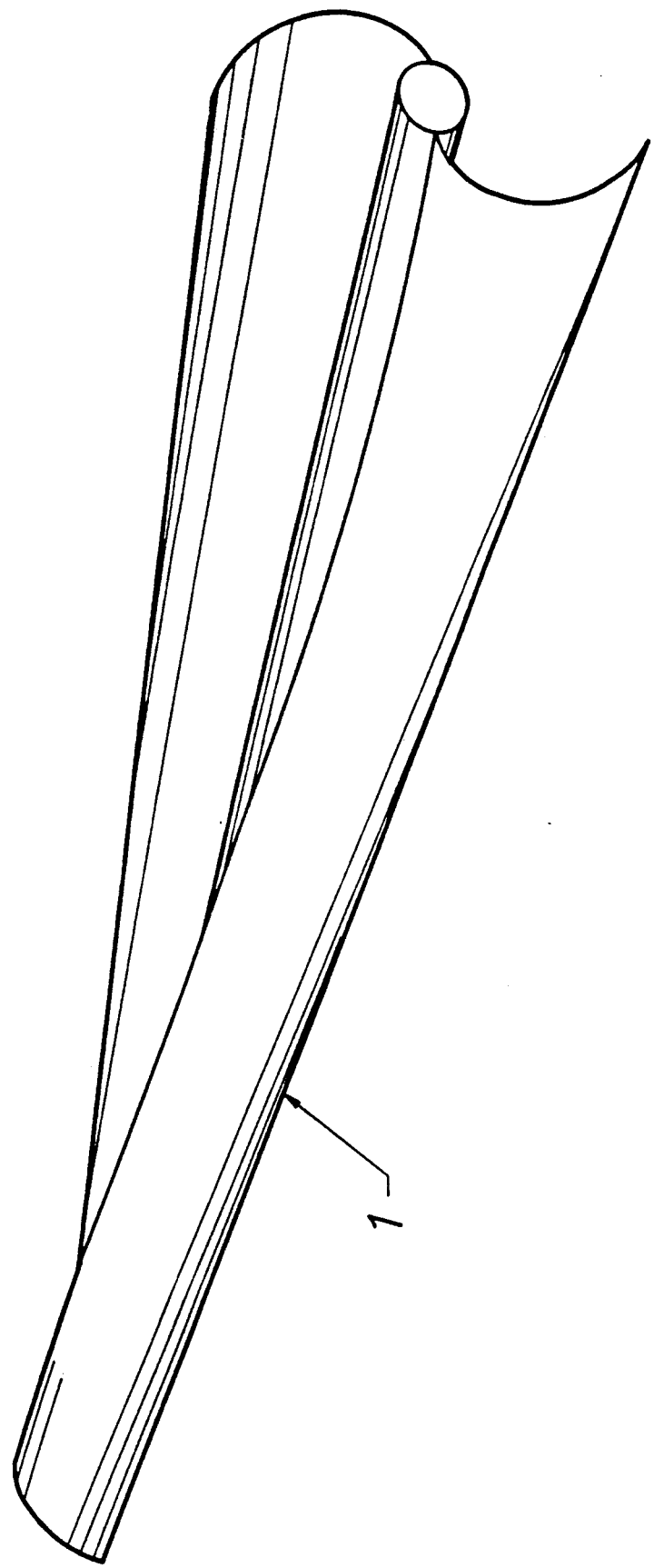
FIG. 2 is an isometric view of the turbine blade.
Figure 3:
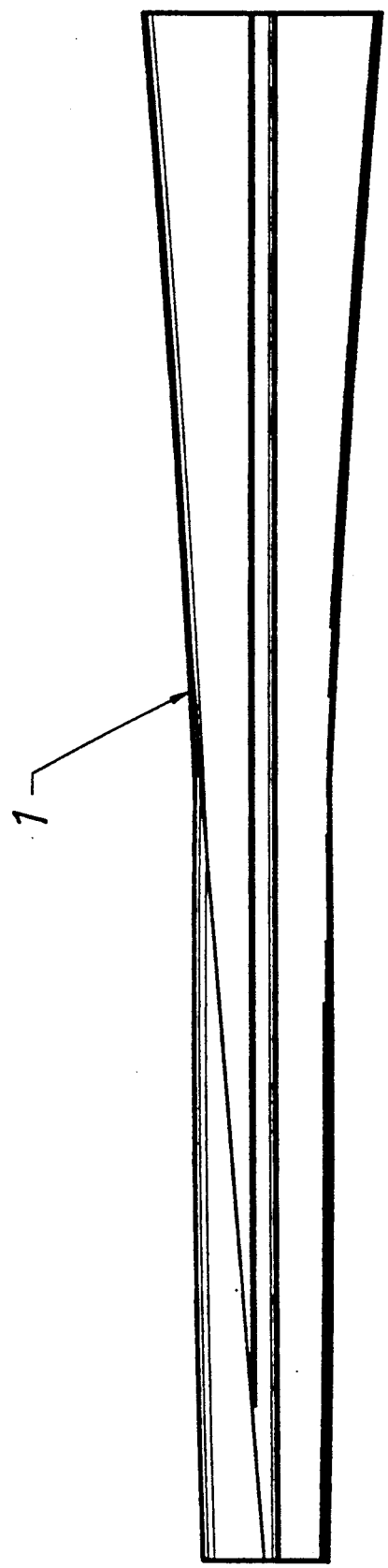
FIG. 3 is an flat overhead view of the turbine blade.
Figure 4:
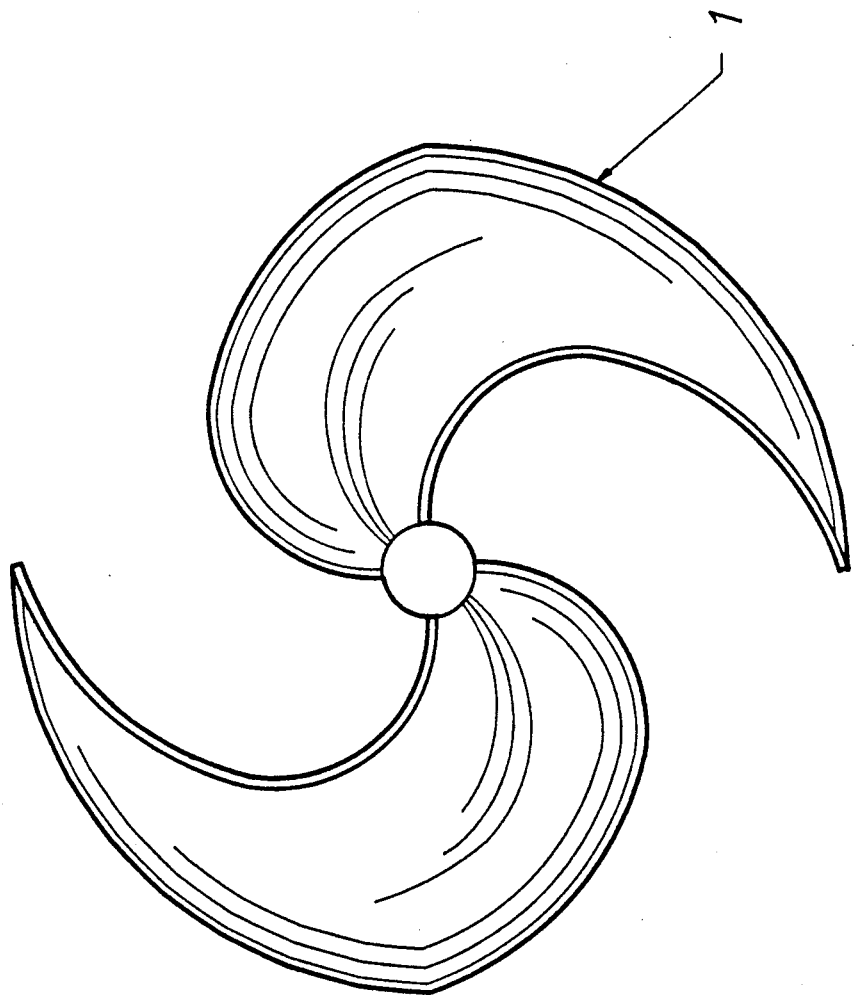
FIG. 4 is an flat end view of the turbine blade.
Figure 5:
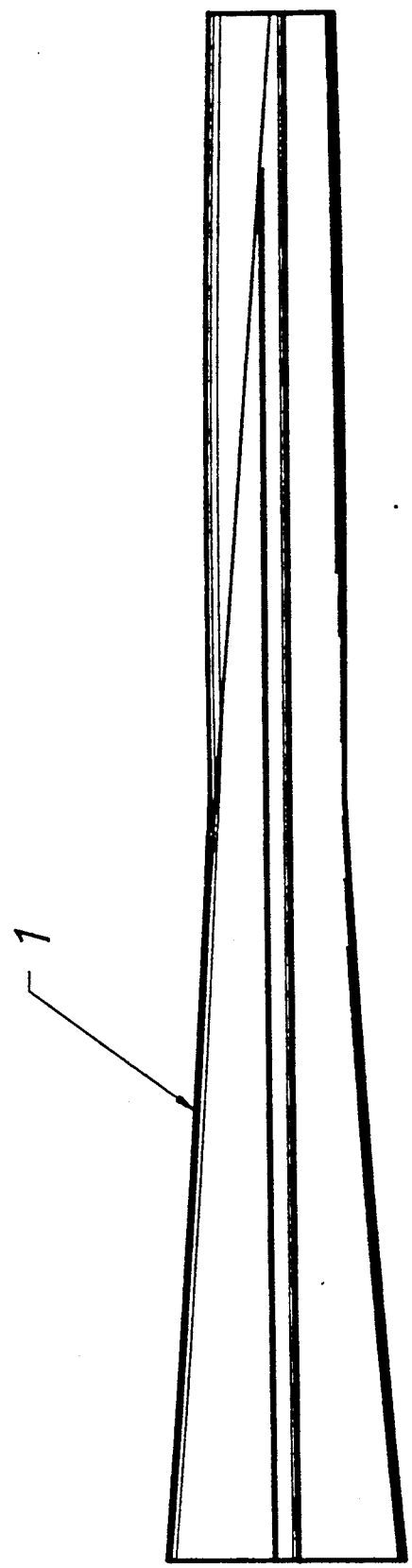
FIG. 5 is a flat front of the turbine blade.
Figure 6:
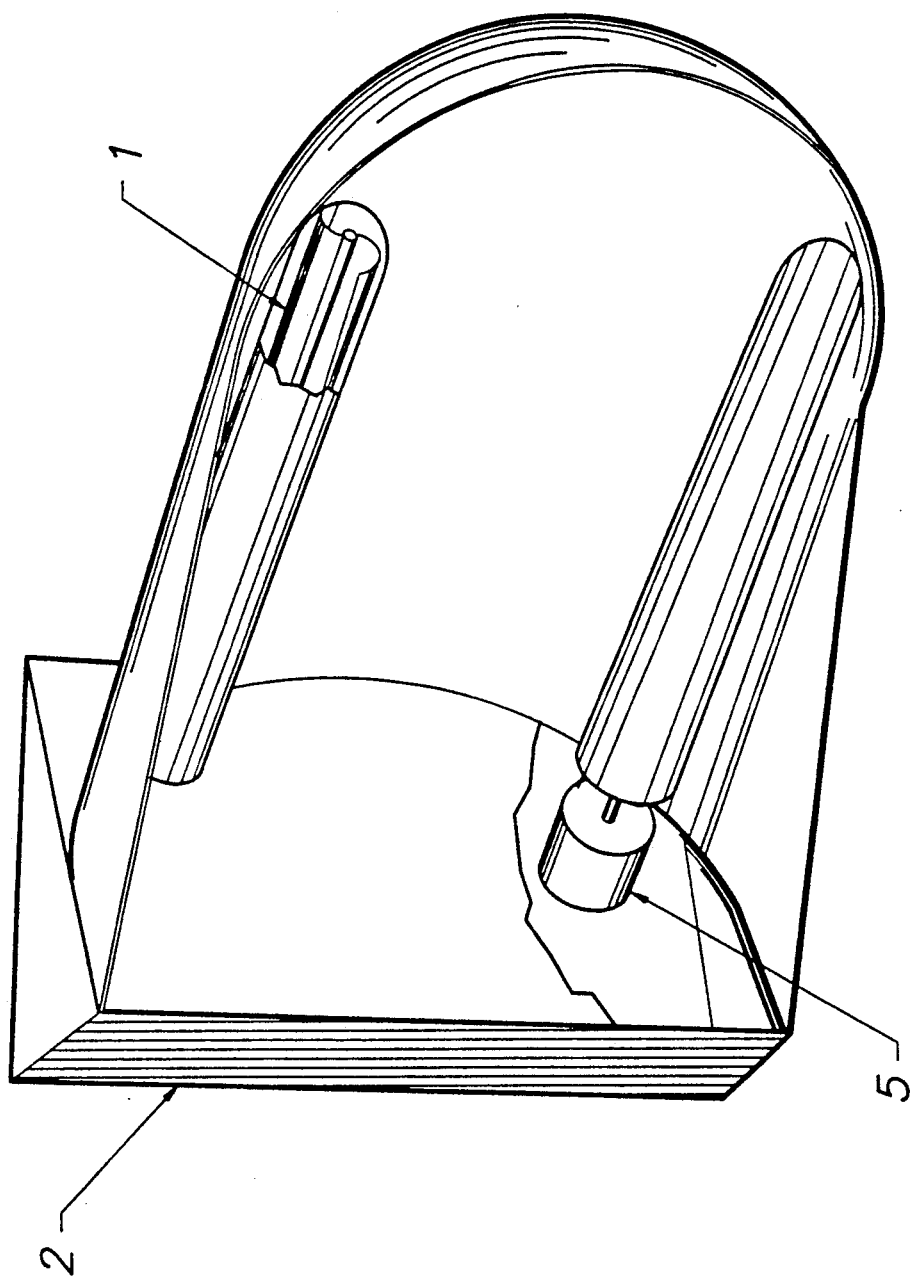
FIG. 6 is an isometric view of the wing with turbine and generator.
Figure 7:
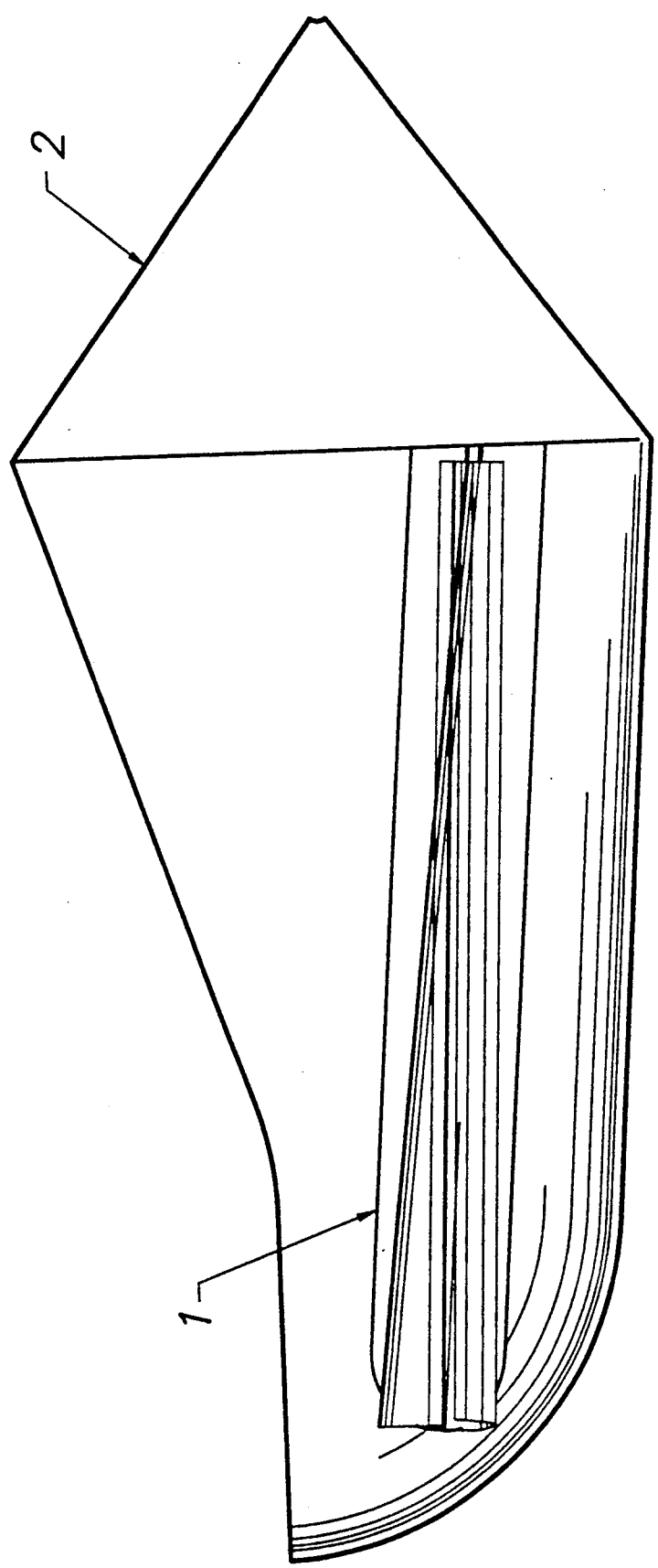
FIG. 7 is an flat overhead view of the wing.
Figure 8:
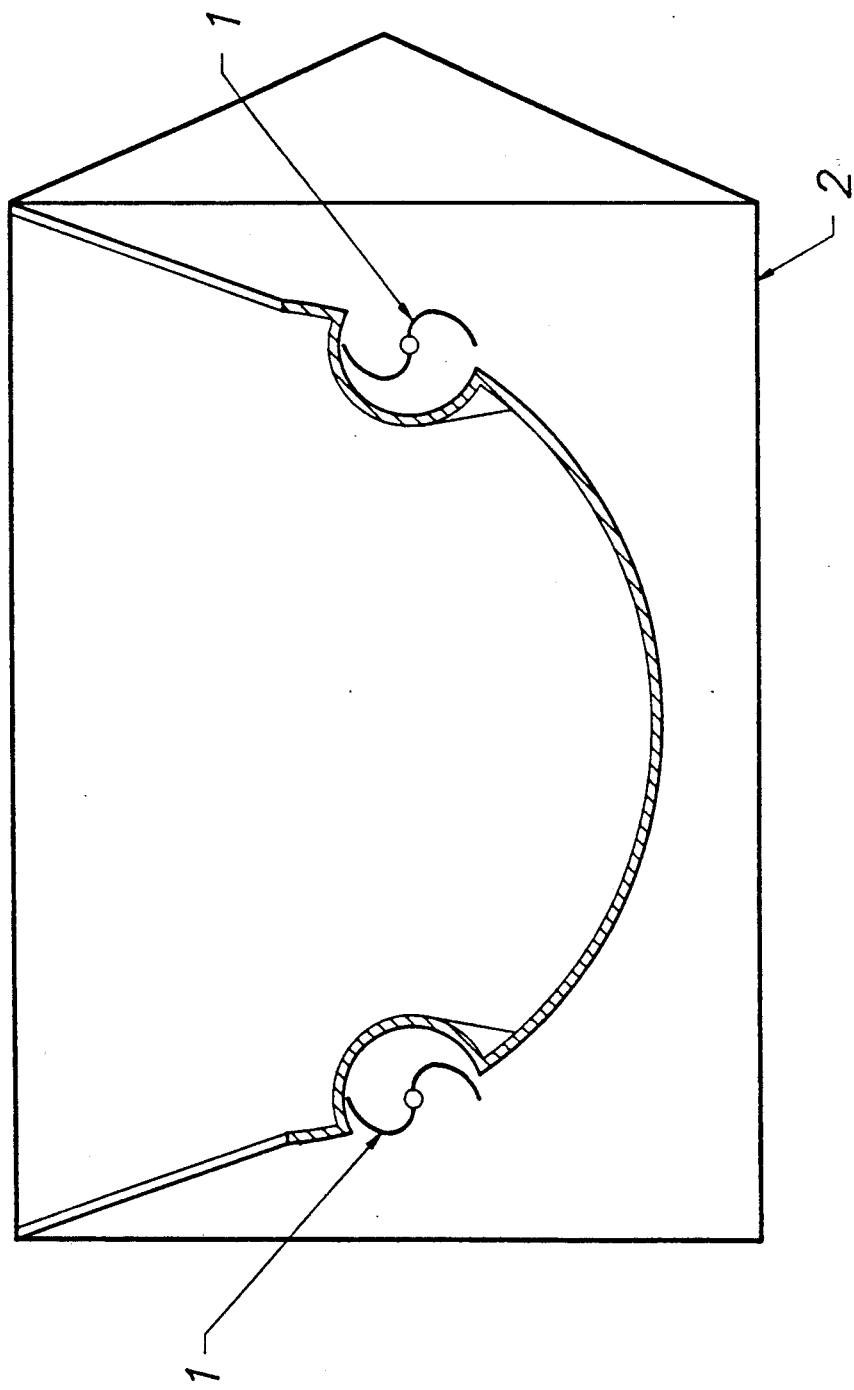
FIG. 8 is an flat end view of the wing.
Figure 9:
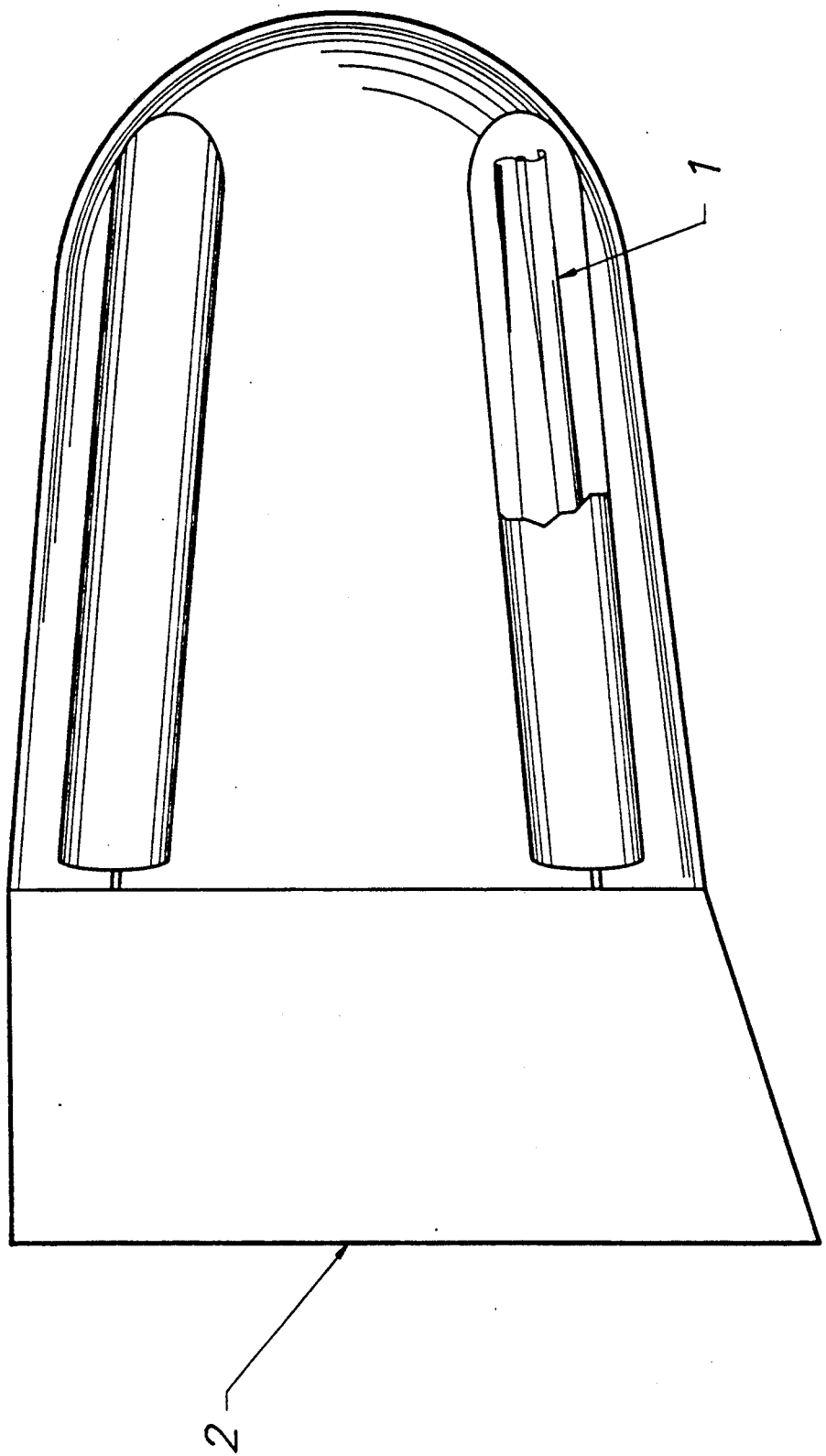
FIG. 9 is a flat front of the wing with turbine and generator.
Figure 10:
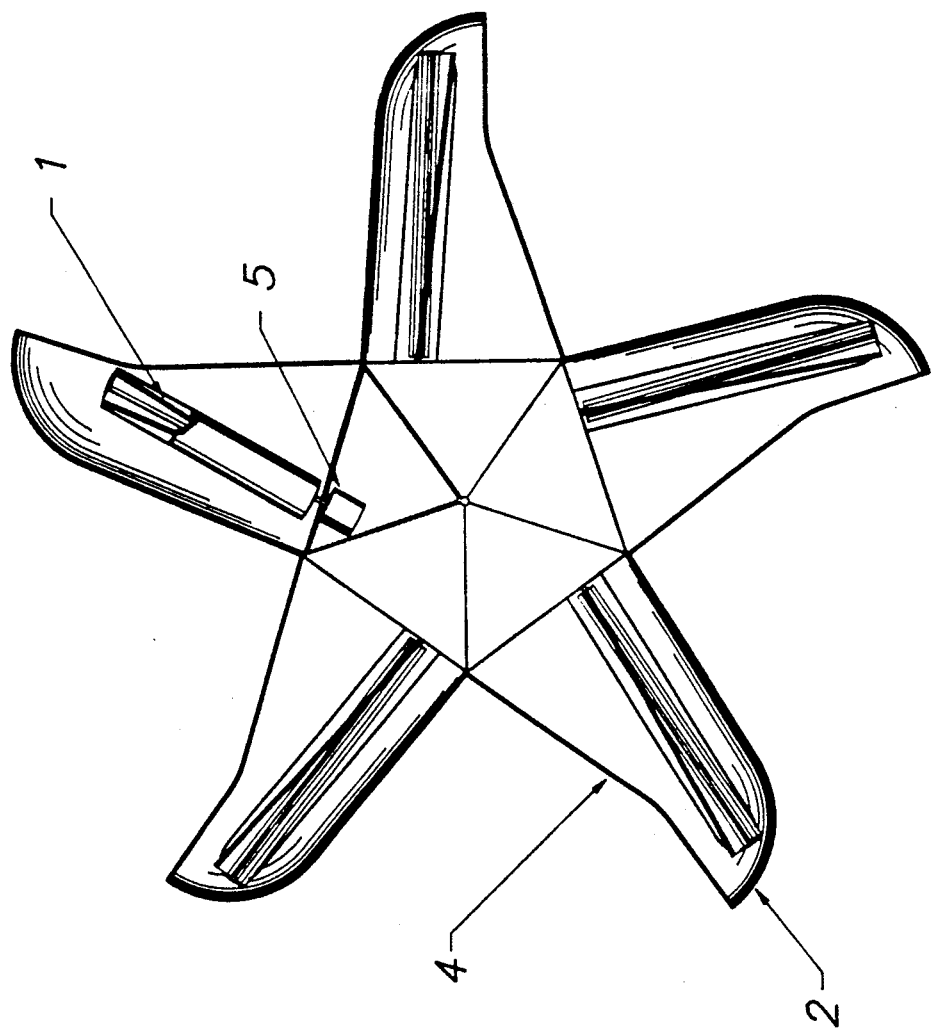
FIG. 10 is a flat overhead view of the main body, which includes 5 wings, 10 turbines and 10 generators.
Figure 11:
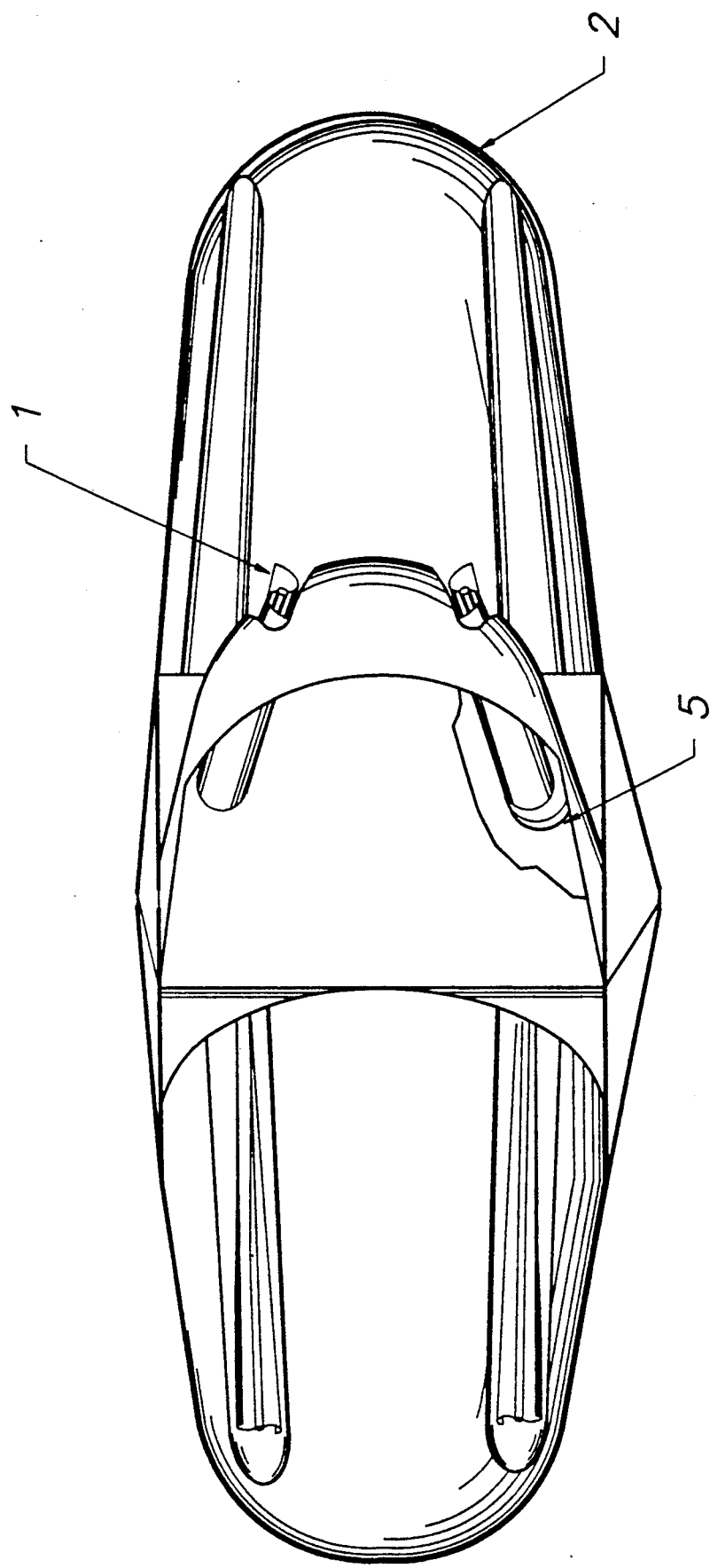
FIG. 11 is a flat front view of the main body.
Figure 12:
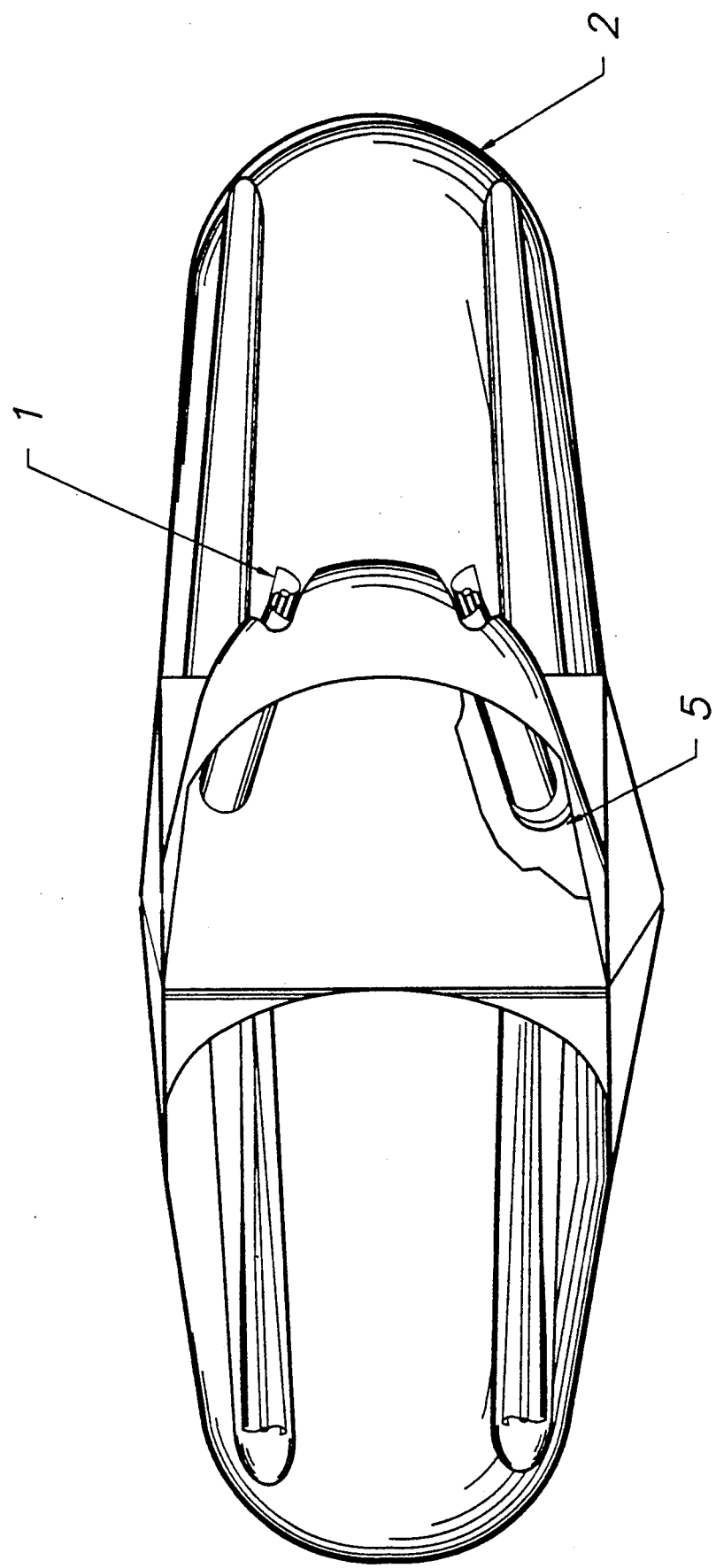
FIG. 12 is a flat side view of the main body.
Figure 13:
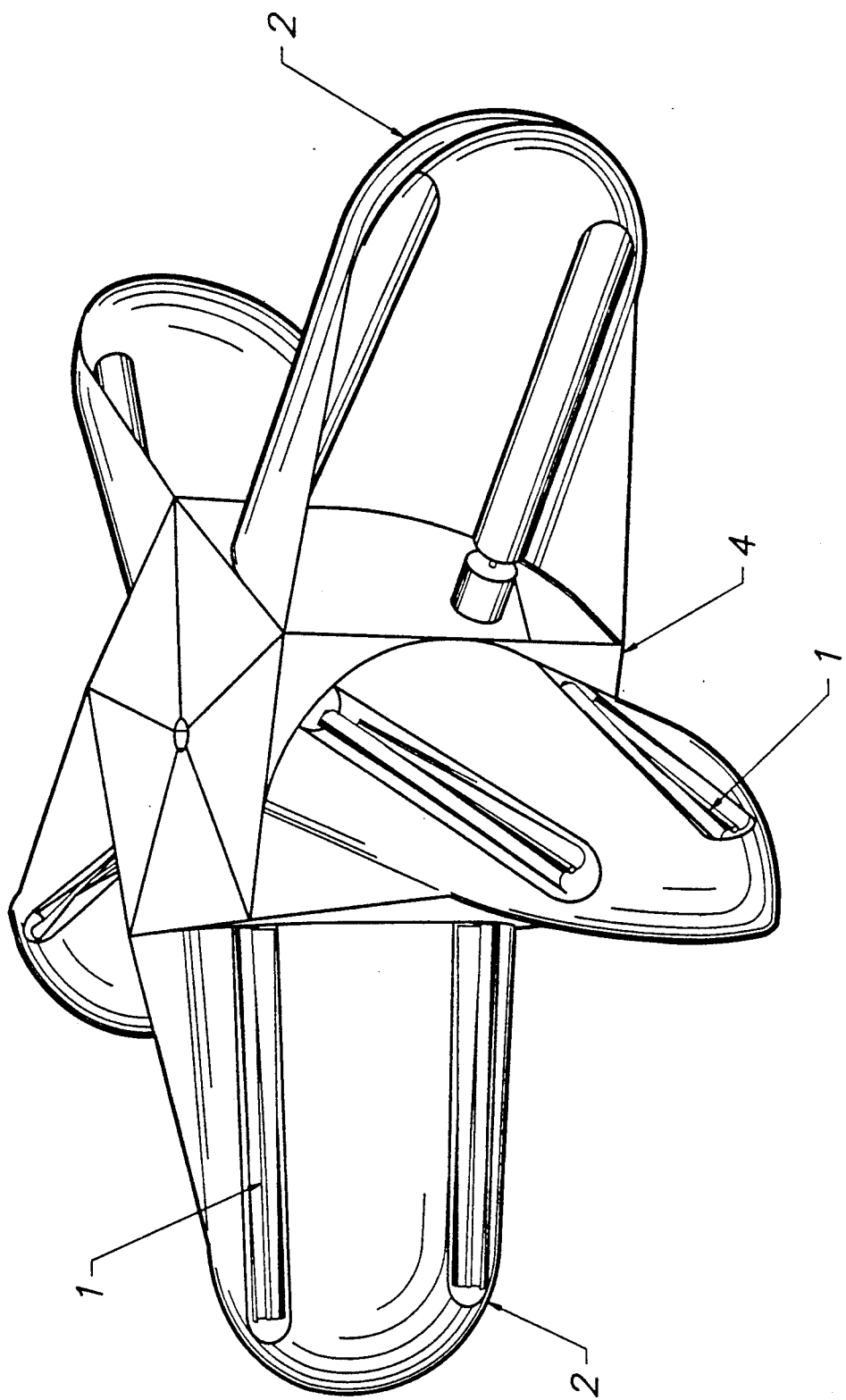
FIG. 13 is an isometric view of the main body.
Figure 14:
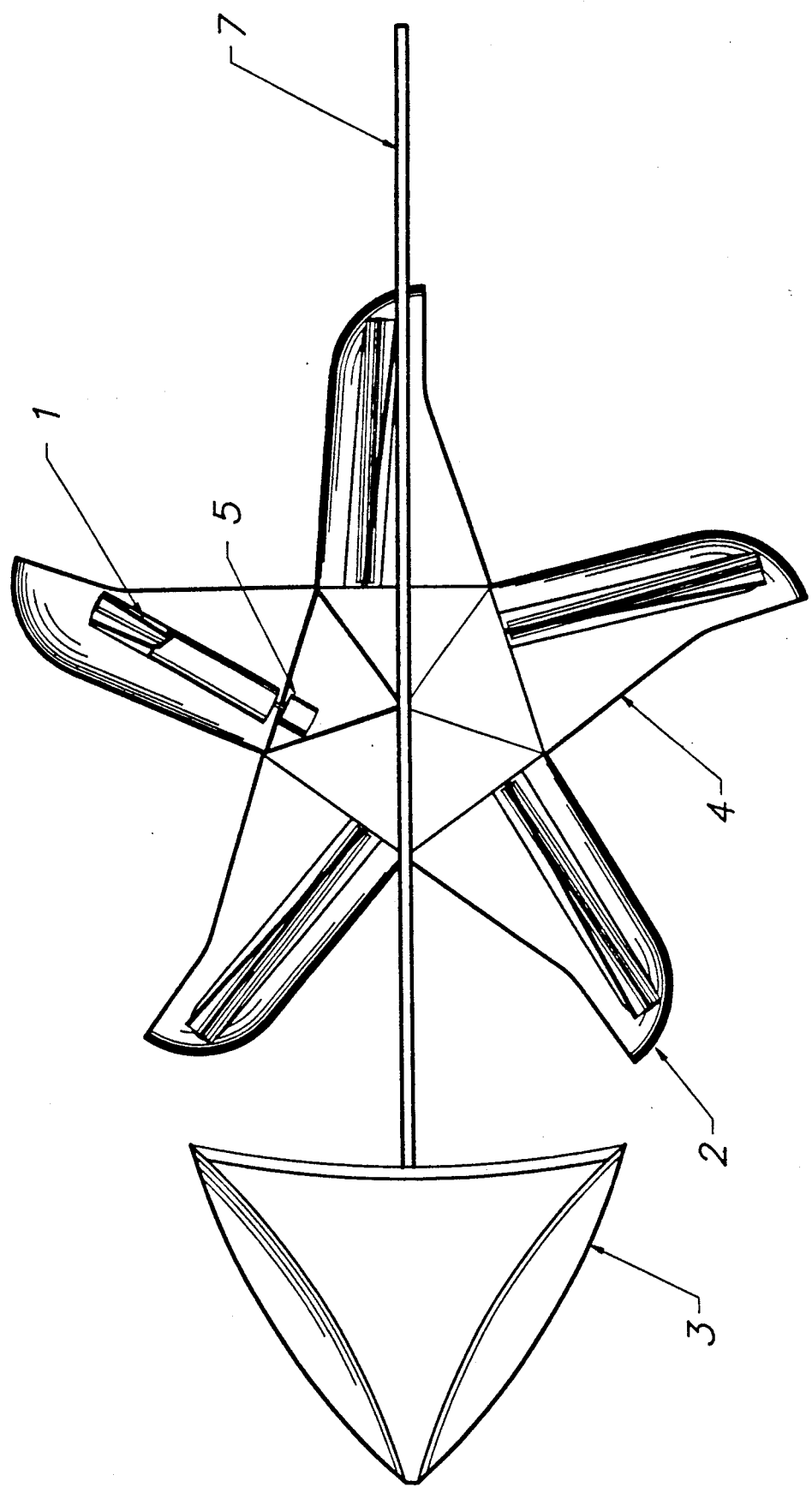
FIG. 14 is an overhead view of the entire wind turbine.
Figure 15:
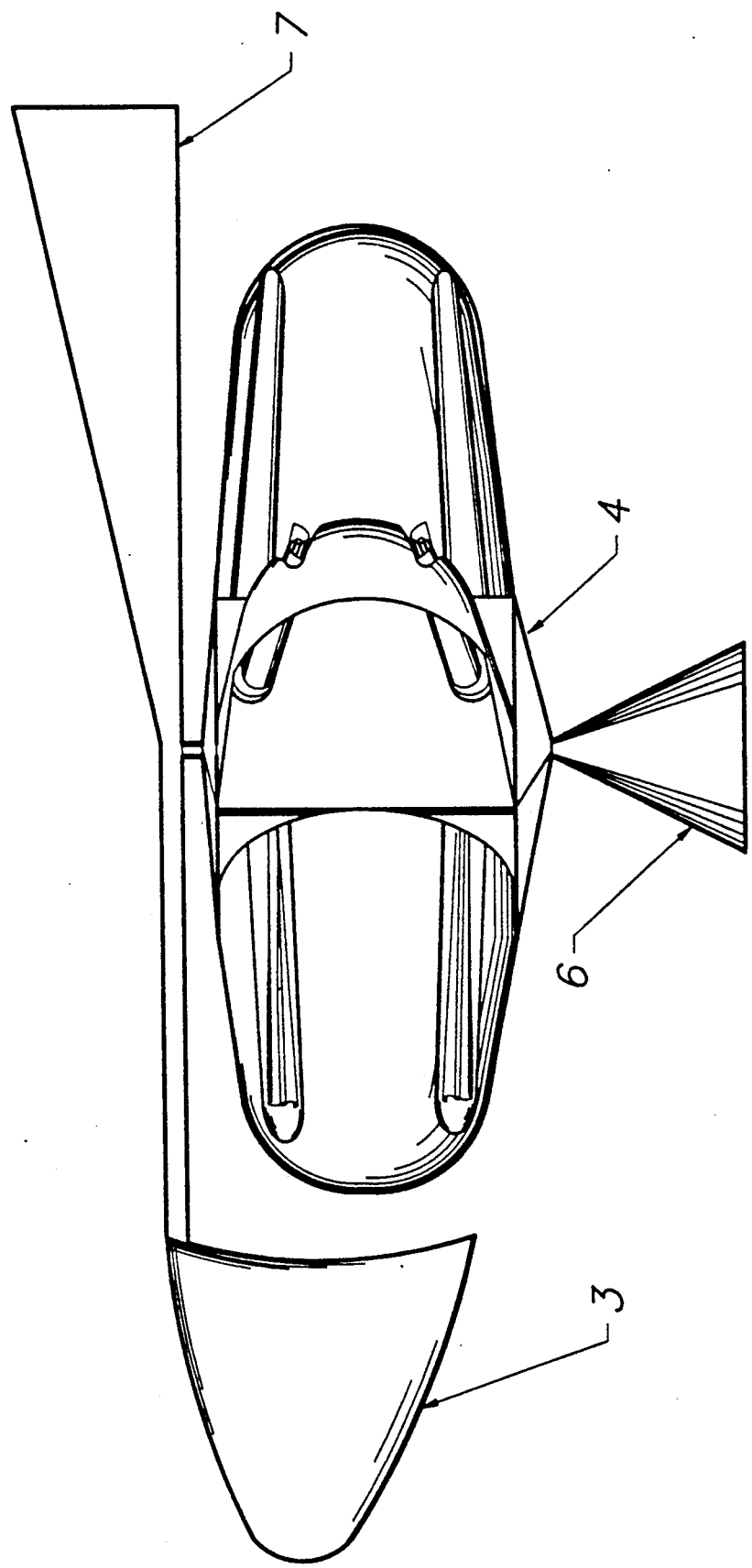
FIG. 15 is a flat side view of the entire wind turbine.
Figure 16:
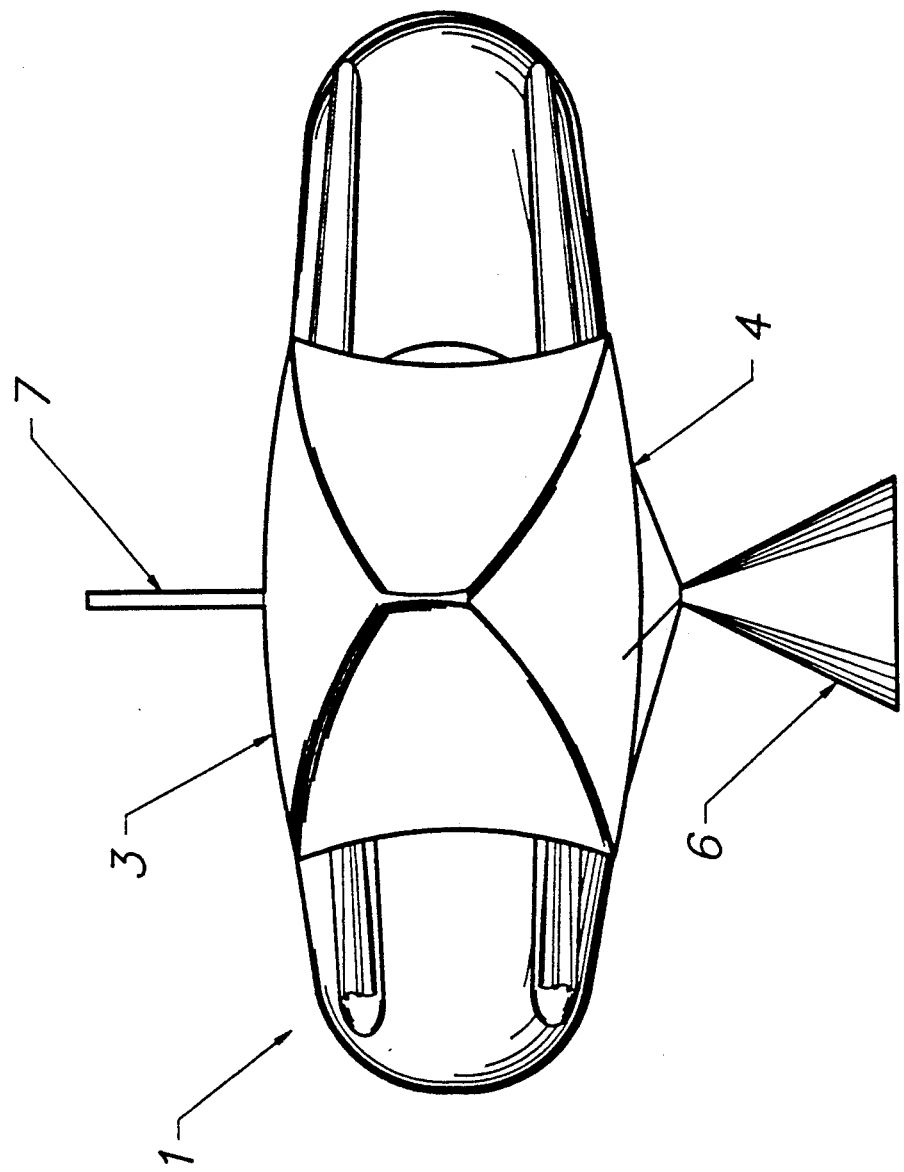
FIG. 16 is a flat front view of the entire wind turbine.

As shown in FIG. 1, the wind turbine 9 of the present invention includes a fixed base 6 on which is mounted a centrally located axle 8 that is the primary axis on which the deflector 3 and tail fin 7 structure rotates. On the same axis 8 the main body 4 also rotates however independently. The main body is made up of five identical wings 2 fastened together and balanced so as to spin like a top. Rotatably connected to each of these wings 2 are two turbines 1 each connected to a generator 5. These turbines are 50% recessed into canals 10 one above and one below the wings. The generators 5 are on the same axis as the turbines 1 however they are located inside the main housing 11 in the center of the main body 9.

What is claimed is:

1. Apparatus for converting the kinetic energy of the passing wind atmosphere into mechanical energy, comprising;
   (a) main body made up of a central hollow core and multiple wings mounted on this central core, these wings having a convex front side and an a concave back side the main body rotating on a vertical axis,
   (b) located on the top and bottom of these wings are canals or indentations near the back of the convex side, said canals are nearly parallel to the front edge of the wing thereby traversing the radius of the circle formed by the main bodes rotation, the outermost point of the canal being closest to the outermost tip of the wing, thereby current is drawn down the canal towards the outermost point, this canal is rounded and the current of air that passes over the convex side of the wing will rotate as it falls into said canal and spills out the outermost point,
   (c) a front deflector which is attached to a rear tail fin so as to head into the air current and tapered so as to deflect the air current out onto the wings of the main body, would rotate on the same axis as the main body however independently,
   (d) in a stationary application the main body and deflector would mount on a base that would provide the axis on which they rotate,
   (e) horizontal turbines rotatably connected with each wing and located in the indentations on the convex side of the wing one above and one below, approximately one half of the radius of said turbines protruding above the convex surface of said wing and one half being hidden in the indentation,
   (f) a means of coupling said turbines with a generator so that the rotary motion can be converted to electricity.

* * * * *